(12) United States Patent
Yin et al.

(10) Patent No.: US 10,886,740 B2
(45) Date of Patent: Jan. 5, 2021

(54) EMERGENCY ACCURATE CONTROL METHOD AND SYSTEM FOR LARGE-SCALE INTERRUPTIBLE LOADS

(71) Applicants: STATE GRID JIANGSU ELECTRIC POWER CO., LTD, Jiangsu (CN); NARI TECHNOLOGY CO., LTD, Jiangsu (CN)

(72) Inventors: Jijun Yin, Jiangsu (CN); Qing Chen, Jiangsu (CN); Gang Chen, Jiangsu (CN); Xiao Lu, Jiangsu (CN); Jianyu Luo, Jiangsu (CN); Haifeng Li, Jiangsu (CN); Xueming Li, Jiangsu (CN); Kaiming Luo, Jiangsu (CN); Lin Liu, Jiangsu (CN); Yunsong Yan, Jiangsu (CN); Yefeng Jiang, Jiangsu (CN); Jianfeng Ren, Jiangsu (CN); Haifeng Xia, Jiangsu (CN)

(73) Assignees: State Grid Jiangsu Electric Power Co., Ltd., Nanjing Jiangsu (CN); Nari Technology Co., Ltd., Nanjine Tianesu (CN)

( * ) Notice: Subject to any disclaimer, the term of this patent is extended or adjusted under 35 U.S.C. 154(b) by 0 days.

(21) Appl. No.: 16/409,564

(22) Filed: May 10, 2019

(65) Prior Publication Data
US 2020/0251901 A1    Aug. 6, 2020

(30) Foreign Application Priority Data
Feb. 1, 2019   (CN) .......................... 2019 1 0103398

(51) Int. Cl.
*H02J 3/14*        (2006.01)
*G05B 19/042*   (2006.01)
*H02J 13/00*     (2006.01)

(52) U.S. Cl.
CPC .............. *H02J 3/14* (2013.01); *G05B 19/042* (2013.01); *H02J 13/0017* (2013.01); *G05B 2219/2639* (2013.01)

(58) Field of Classification Search
None
See application file for complete search history.

(56) References Cited

U.S. PATENT DOCUMENTS

2010/0031241 A1* 2/2010 Schwartz ................ G06F 8/456
                                                                         717/149
2020/0227938 A1* 7/2020 Pancheri ................... H02J 3/14
(Continued)

FOREIGN PATENT DOCUMENTS

CN    106877342 A    6/2017
CN    107134787 A    9/2017
CN    108539750 A    9/2018

OTHER PUBLICATIONS

International Search Report received from International application No. PCT/CN2019/077323 dated Oct. 29, 2019.

*Primary Examiner* — Ryan A Jarrett
(74) *Attorney, Agent, or Firm* — Arent Fox LLP (57) ABSTRACT

Provided is an emergency accurate control method and system for large-scale interruptible loads. The method includes: acquiring, by a region control master station, a sheddable load sequence table; acquiring, by the region control master station, a first to-be-shed load; performing, by the region control master station, minimum under-shedding matching layer by layer according to the first to-be-shed load, and shedding a sheddable load corresponding to control substation matching with the first to-be-shed load; and sending, by the region control master station, a second to-be-shed load to the corresponding control substation for load shedding if the second to-be-shed load exists.

10 Claims, 4 Drawing Sheets

(56) References Cited

U.S. PATENT DOCUMENTS

2020/0251900 A1\* 8/2020 Xia ........................ G06Q 50/06
2020/0252226 A1\* 8/2020 Yin ........................ H04L 12/10
2020/0252833 A1\* 8/2020 Yin ....................... H04W 28/08

\* cited by examiner

EMERGENCY ACCURATE CONTROL METHOD AND SYSTEM FOR LARGE-SCALE INTERRUPTIBLE LOADS

CROSS-REFERENCE TO RELATED APPLICATIONS

This application claims priority to a Chinese patent application No. 201910103398.4 filed on Feb. 1, 2019, the disclosure of which is incorporated herein by reference in its entirety.

TECHNICAL FIELD

Embodiments of the present disclosure relate to the technical field of power systems and automation thereof, and particularly relate to an emergency accurate control method and system for large-scale interruptible loads.

BACKGROUND

Existing second and third lines of defense of the China Grid mainly solve low-frequency problems of a system by means of a control measure of collectively shedding 110 kV and 35 kV load lines of a transformer substation through a safety and stability control system and a low-frequency load shedding apparatus. An existing load emergency control object has large granularity, and all the loads on the shed 110 kV and 35 kV lines will be powered off, which will bring significant losses to the national economy and the production and life of people. After the implementation of the measure, unbalanced capacity is relatively large, and new stability problems will occur in small-scale grids. In another aspect, the number of load shedding execution stations that are connected to the existing safety and stability control system is limited. At present, a maximum of 100 control master stations can be connected, which cannot meet the access of large-scale dispersed interruptible load stations. At present, the low-frequency load shedding apparatus also takes the locally collected 110 kV and 35 kV load lines as single control objects, and a large number of interruptible load branch circuits cannot be distinguished from uninterruptible load branch circuits on the shed lines in low-frequency load shedding. Local frequency response-dependent control points, mutually independent measures that are difficult to coordinate and uncountable control capacity will cause large-area power outage losses.

In the related art, load emergency control objects which are 110 kV and 35 kV load lines collected by the substation in situ cannot support the access of the large-scale dispersed interruptible load stations, a large number of interruptible load branch circuits cannot be distinguished from uninterruptible load branch circuits on the shed lines, and the relatively high unbalanced capacity after the measures are implemented will cause the large-area power outage losses.

SUMMARY

Embodiments of the present disclosure provide an emergency accurate control method and system for large-scale interruptible loads, so as to meet a demand for quick shedding control of socially widely distributed interruptible loads according to a required load shedding capacity under large disturbance of a grid and to achieve effects of accurate control of objects, accurate control capacity distribution and execution and large scale of accessed load stations.

In a first aspect, embodiments of the present disclosure provide an emergency accurate control method for large-scale interruptible loads. The method is applied to an emergency accurate control system for large-scale interruptible loads. The emergency accurate control system for interruptible loads includes a region control master station, control substations, and load control terminals. The region control master station is connected with the control substations. Each control substation is connected with at least one load control terminal. The method includes:

acquiring, by the region control master station, a sheddable load sequence table, where the sheddable load sequence table includes a sheddable load of each layer of each control substation; acquiring, by the region control master station, a first to-be-shed load; performing, by the region control master station, minimum under-shedding matching layer by layer in the sheddable load sequence table according to the first to-be-shed load, and shedding a sheddable load corresponding to at least one control substation matching with the first to-be-shed load; and sending, by the region control master station, a second to-be-shed load to a to-be-shed control substation for load shedding if the second to-be-shed load exists, where the total amount of the sheddable load corresponding to the at least one control substation matching with the first to-be-shed load is equal to a difference between the first to-be-shed load and the second to-be-shed load.

In an embodiment, the step of acquiring, by the region control master station, the sheddable load sequence table specifically includes:

receiving, by the region control master station, a sheddable load, sent by each control substation, of each layer of the each control substation, and generating the sheddable load sequence table.

The sheddable load of each layer of each control substation is obtained from collection and calculation of sheddable load information received by the each control substation from all the load control terminals connected to the each control substation, and the sheddable load information of each load control terminal of the load control terminals includes a total power of all sheddable load branches under the each load control terminal.

In an embodiment, the step of performing, by the to-be-shed control substations, the load shedding according to the second to-be-shed load includes:

acquiring, by the each control substation, a sheddable terminal load sequence table;

performing, by the to-be-shed control substation, the minimum under-shedding matching layer by layer in the sheddable terminal load sequence table according to the second to-be-shed load, and shedding a sheddable load corresponding to at least one load control terminal matching with the second to-be-shed load; and sending, by the to-be-shed control substation, a third to-be-shed load to a to-be-shed load control terminal for load shedding if the third to-be-shed load exists, where the total amount of the sheddable load corresponding to the at least one load control terminal is equal to a difference between the second to-be-shed load and the third to-be-shed load.

In an embodiment, the step of performing, by the to-be-shed load control terminal, the load shedding according to the third to-be-shed load includes:

sorting, by the to-be-shed load control terminal, all sheddable load branches under the to-be-shed load control terminal using quicksort in an order of descending priority, and generating a sheddable load branch sequence table; and performing, by the to-be-shed load control terminal, the minimum under-shedding matching in the sheddable load branch sequence table according to the third to-be-shed load, and shedding a load corresponding to at least one sheddable load branch matching with the third to-be-shed load.

In an embodiment, the region control master station communicates with the control substations through a 2M channel of a Synchronous Digital Hierarchy (SDH) backbone transmission network; the control substations communicate with the load control terminals in any one of or a combination of various ways of shared 2M channel for communication optical cables, exclusive 2M channel for coaxial cables, wireless communication via 4G private network and Ethernet.

In a second aspect, embodiments of the present disclosure further provide an emergency accurate control system for large-scale interruptible loads, including:

a region control master station, control substations and load control terminals. The region control master station is connected with the control substations, and each control substation is connected with at least one load control terminal.

The region control master station is configured to: acquire a sheddable load sequence table which includes a sheddable load of each layer of the each control substation; acquire a first to-be-shed load; perform minimum under-shedding matching layer by layer in the sheddable load sequence table according to the first to-be-shed load, and shed a sheddable load corresponding to at least one control substation matching with the first to-be-shed load; and send a second to-be-shed load to a to-be-shed control substation for load shedding if the second to-be-shed load exists, where the total amount of the sheddable load corresponding to the at least one control substation matching with the first to-be-shed load is equal to a difference between the first to-be-shed load and the second to-be-shed load.

In an embodiment, the region control master station is specifically configured to receive a sheddable load, sent by the each control substation, of each layer of the each control substation, and generate the sheddable load sequence table. The sheddable load of each layer of the each control substation is obtained from collection and calculation of sheddable load information received by the each control substation from all the load control terminals connected to the each control substation, and the sheddable load information of each load control terminal of the plurality of load control terminals includes a total power of all sheddable load branches under the each load control terminal.

In an embodiment, the control substations are configured to: acquire a sheddable terminal load sequence table; perform the minimum under-shedding matching layer by layer in the sheddable terminal load sequence table according to the second to-be-shed load, and shed a sheddable load corresponding to at least one load control terminal matching with the second to-be-shed load; and send a third to-be-shed load to a to-be-shed load control terminal for load shedding if the third to-be-shed load exists, where the total amount of the sheddable load corresponding to the at least one load control terminal is equal to a difference between the second to-be-shed load and the third to-be-shed load.

In an embodiment, the each load control terminal is configured to: sort all sheddable load branches under the to-be-shed load control terminal using quicksort in an order of descending priority, and generate a sheddable load branch sequence table; and perform the minimum under-shedding matching in the sheddable load branch sequence table according to the third to-be-shed load, and shed a load corresponding to at least one sheddable load branch matching with the third to-be-shed load.

In an embodiment, the region control master station communicates with the control substations through a 2M channel of an SDH backbone transmission network. The control substations communicate with the load control terminals in any one of or a combination of various ways of shared 2M channel for communication optical cables, exclusive 2M channel for coaxial cables, wireless communication via 4G private network and Ethernet.

The emergency accurate control method for the large-scale interruptible loads, provided by embodiments of the present disclosure, includes: acquiring, by the region control master station, the sheddable load sequence table which includes the sheddable load of each layer of each control substation; acquiring, by the region control master station, the first to-be-shed load; performing, by the region control master station, the minimum under-shedding matching layer by layer in the sheddable load sequence table according to the first to-be-shed load, and shedding the sheddable loads corresponding to the control substation matching with the first to-be-shed load; and sending, by the region control master station, the second to-be-shed load to a to-be-shed control substation for the load shedding if the second to-be-shed load exists. The total amount of the sheddable load corresponding to the control substation matching with the first to-be-shed load is equal to a difference between the first to-be-shed load and the second to-be-shed load. The emergency accurate control system for the large-scale interruptible loads, provided by embodiments of the present disclosure, supports the access of the large-scale dispersed interruptible load stations and realizes accurate and quick shedding of the interruptible loads by layer-by-layer minimum under-shedding matching according to the order of priority.

BRIEF DESCRIPTION OF DRAWINGS

To describe the embodiments of the present disclosure more clearly, drawings to be used in the description of the embodiments of the present disclosure will be briefly introduced below. Apparently, the drawings described below are only some embodiments of the present disclosure. Those ordinary skilled in the art can further obtain other drawings without paying creative work according to the contents of the embodiments of the present disclosure and these drawings.

DETAILED DESCRIPTION

The present disclosure will be further described below in detail in combination with drawings and embodiments. It can be understood that specific embodiments described herein are only used for explaining the present disclosure, not used for limiting the present disclosure. In addition, it shall be indicated that for ease of description, drawings only show some structures related to the present disclosure rather than all structures.

Figure 1:
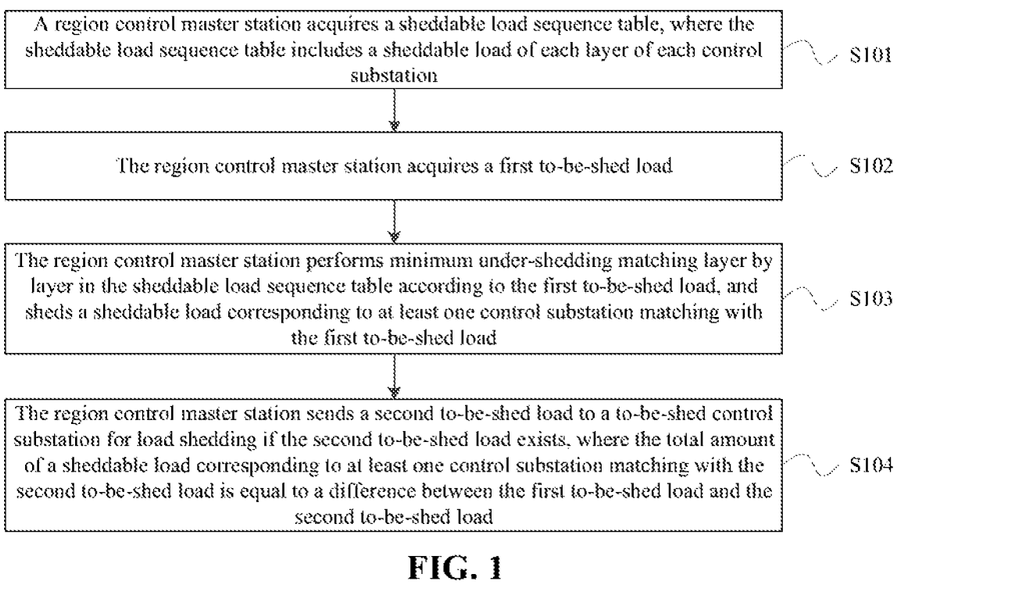
FIG. 1 is a flow chart illustrating an emergency accurate control method for large-scale interruptible loads provided by an embodiment of the present disclosure.

FIG. 1 is a flow chart illustrating an emergency accurate control method for large-scale interruptible loads provided by an embodiment of the present disclosure. The emergency accurate control method for large-scale interruptible loads provided by an embodiment of the present disclosure is applied to an emergency accurate control system for large-scale interruptible loads. The emergency accurate control system for the interruptible loads includes a region control master station, control substations and load control terminals. The region control master station is connected with at least one control substation. Each control substation is connected with at least one load control terminal. Referring to FIG. 1, the method includes steps described below.

In step S101, the region control master station acquires a sheddable load sequence table, where the sheddable load sequence table includes a sheddable load of each layer of each control substation.

Specifically, the sheddable load sequence table includes sheddable load capacity information of each layer, uploaded by each control substation and received by the region control master station. The sheddable load sequence table includes a set of all sheddable load capacities within a control range of the region control master station.

In step S102, the region control master station acquires a first to-be-shed load.

Specifically, when the grid fails, the region control master station receives a load shedding instruction from a superior control station or executes a local control strategy, decomposes a control instruction according to a distribution algorithm to acquire the first to-be-shed load. The first to-be-shed load is load capacity to be shed.

In step S103, the region control master station performs minimum under-shedding matching layer by layer in the sheddable load sequence table according to the first to-be-shed load, and sheds a sheddable load corresponding to a control substation matching with the first to-be-shed load.

Specifically, the region control master station calculates and sorts the sheddable load capacity information of each layer of each control substation in the sheddable load sequence table, and generates the sheddable substation load sequence table. The first to-be-shed load is matched layer by layer in the sheddable substation load sequence table according to the minimum under-shedding rule. If the first to-be-shed load is successfully matched, the region control master station sheds the sheddable load corresponding to the successfully matched control substation; otherwise, the region control master station continuous to perform layer-by-layer matching between the first to-be-shed load and the sheddable substation load sequence table till the first to-be-shed load is successfully matched.

In step S104, the region control master station sends a second to-be-shed load to the to-be-shed control substation for load shedding if the second to-be-shed load exists, where the total amount of the sheddable load corresponding to the control substation matching with the first to-be-shed load is equal to a difference between the first to-be-shed load and the second to-be-shed load.

Specifically, the second to-be-shed load refers to a remaining to-be-shed load after the region control master station performs the layer-by-layer matching in the sheddable substation load sequence table according to the to-be-shed load capacity and sheds the sheddable load corresponding to the successfully matched control substation. The remaining to-be-shed load is less than the sheddable load of the last control substation. If a second to-be-shed load exists, the region control master station sends the second to-be-shed load to the to-be-shed control substation, and the to-be-shed control substation perform the minimum under-shedding matching and the load shedding on a load control terminal corresponding to the to-be-shed control substation layer by layer according to the minimum under-shedding rule, so as to realize emergency accurate control of the large-scale dispersed interruptible loads and achieve quick and accurate shedding of the large-scale dispersed interruptible loads.

The emergency accurate control method for the large-scale interruptible loads, provided by the embodiment of the present disclosure, includes: the region control master station acquires the sheddable load sequence table which includes the sheddable load of each layer of each control substation; the region control master station acquires the first to-be-shed load; the region control master station performs the minimum under-shedding matching layer by layer in the sheddable load sequence table according to the first to-be-shed load, and sheds the sheddable load corresponding to the control substation matching with the first to-be-shed load; and the region control master station sends the second to-be-shed load to the to-be-shed control substation for load shedding if the second to-be-shed load exists. The total amount of the sheddable load corresponding to the control substation matching with the first to-be-shed load is equal to a difference between the first to-be-shed load and the second to-be-shed load. The emergency accurate control method for the large-scale interruptible loads, provided by the embodiment of the present disclosure, realizes accurate and quick shedding of the sheddable loads by layer-by-layer minimum under-shedding matching according to the order of priority, realizes the access of the large-scale dispersed interruptible load stations.

In an embodiment, the step in which the region control master station acquires the sheddable load sequence table specifically includes: the region control master station receives a sheddable load, sent by each control substation, of each layer of the control substation; and generates the sheddable load sequence table. The sheddable load of each layer of each control substation is obtained from collection and calculation of sheddable load information received by each control substation from all the load control terminals connected to the control substation, and the sheddable load information of each load control terminal includes a total power of all sheddable load branches under each load control terminals.

Specifically, each load control terminal collect active power of the interruptible load branch circuits, calculate a total sheddable load of the load control terminal, and send the total sheddable load to the control substation. The control substation divides load control terminals into layers according to layer setting values, calculate a total sheddable load of each layer and respectively send the total sheddable load to the region control master station. The region control master station receives the sheddable load information of each layer of each control substation, calculates and sorts the sheddable load information of all control substations on each layer, and generates the sheddable load sequence table.

Exemplarily, a load control terminal collects a voltage signal, a current signal and a switch position signal of each interruptible load branch circuit of this station and calculates an active power of each interruptible load branch circuit in real time. The total sheddable load of the load control terminal is calculated in real time according to conditions such as a shedding-allowable state, work and stop state and a power direction of each branch circuit. Exemplarily, the total sheddable load of the first load control terminal in the first control substation is denoted as $P_{all}^{11}$ and is sent to a first control substation.

The control substation receives the sheddable load sent by each load control terminal subordinate to the control substation. Each load control terminal has a layer setting value of a load shedding order. The layer setting value may be set to be a natural number, such as 1, 2, 3, 4, . . . , n. The smaller the value is, the higher the priority is, that is, the load control terminal is shed more preferentially. The load control terminals are counted layer by layer according to the layer setting values of the load control terminals to calculate the sheddable load of each layer in real time. The loads of layers 1 to n of the first control substation may be denoted as: $P_1^1$, $P_2^1$, $P_3^1$ . . . $P_n^1$ and are submitted to the region control master station.

The region control master station receives the sheddable load capacity information of the layers 1 to n of each control substation subordinate to the region control master stations, and calculates and sorts the sheddable load sequence tables of each layer of each control substation.

It is assumed that m control substations access the region control master station, and a load of each control substation is divided into n layers. $P_{11}$ is a load of the first layer of the first control substation; $P_{21}$ is a load of the first layer of the second control substation; $P_{1n}$ is a load of the nth layer of the first control substation; accordingly, $P_{mn}$ is a load of the nth layer of the mth control substation, so the sheddable load sequence table of the region control master station is as follows:

the load of the first layer: $P_{11}$, $P_{21}$, $P_{31}$ . . . $P_{m1}$;
the load of the second layer: $P_{12}$, $P_{22}$, $P_{32}$ . . . $P_{m2}$;
the load of the third layer: $P_{13}$, $P_{23}$, $P_{33}$ . . . $P_{m3}$;
the load of the nth layer: $P_{1n}$, $P_{2n}$, $P_{3n}$ . . . $P_{mn}$.

The priority of the first layer may be set to be higher than that of the second layer, and accordingly, the priority of the nth layer is lowest.

The region control master station obtains the first to-be-shed load $P_{cut0}$ by receiving a load shedding capacity instruction from the superior control station or according to other control strategies. In order to facilitate the region control master station to shed the sheddable load capacity of the subordinate control substations, the region control master station further calculates and sorts the sheddable load information of each layer of each control substation, and generates the sheddable substation load sequence table.

Exemplarily, the sheddable substation load sequence table is as follows:

$p_{11}$,
$\Sigma(P_{11},P_{21})$,
$\Sigma(P_{11},P_{21},P_{31})$,
$\Sigma(P_{11},P_{21},P_{31} \ldots P_{m1})$,
$\Sigma(P_{11},P_{21},P_{31} \ldots P_{m1},P_{12})$,
$\Sigma(P_{11},P_{21},P_{31} \ldots P_{m1},P_{12},P_{22})$,
$\Sigma(P_{11},P_{21},P_{31} \ldots P_{m1},P_{12},P_{22},P_{32})$, In order to have the to-be-shed load capacity $P_{cut0}$ included between $P_{11}+P_{21}$ and $P_{11}+P_{21}+P_{31}$ of the first layer of the region control master station, i.e., $\Sigma(P_{11},P_{21}) \leq P_{cut0} < \Sigma(P_{11},P_{21},P_{31})$, all loads of the first layer of the first control substation and the first layer of the second control substation are directly shed, and the remaining to-be-shed load capacity is denoted as the second to-be-shed load $P_{cut1}$, then $P_{cut1}=P_{cut0}-\Sigma(P_{11}, P_{21})$.

If $P_{cut1}=0$, an instruction is directly sent to shed all the loads of the first layers of the first control substation and the second control substation, and the distribution is ended. If $P_{cut1}>0$, an instruction including the second to-be-shed load $P_{cut1}$ is sent to the third control substation.

It should be noted that the to-be-shed control substation in the present embodiment is the third control substation.

The emergency accurate control method for large-scale interruptible loads of the present embodiment realizes layer-by-layer distribution of the loads and preferentially sheds the sheddable loads of the control substations corresponding to the layers with the high priorities within the to-be-shed capacity range.

Figure 2:
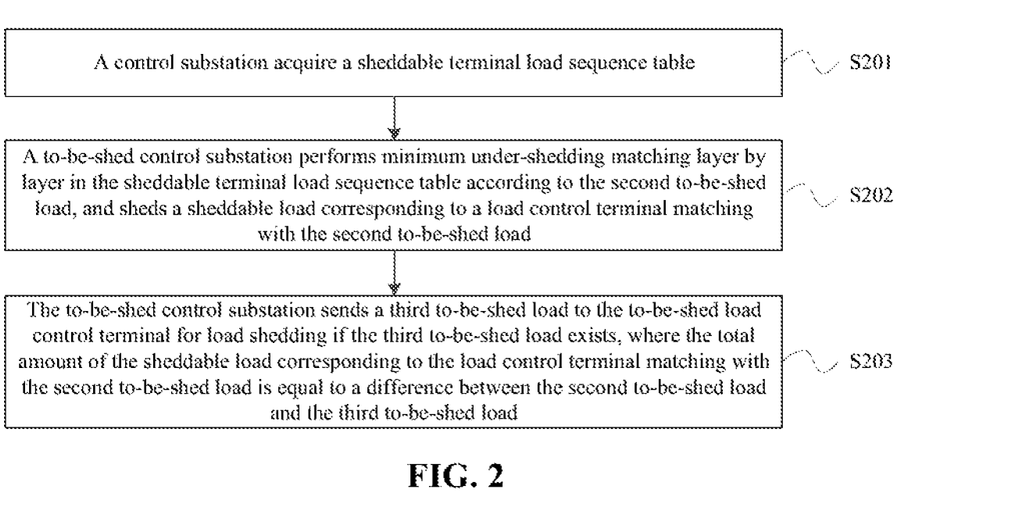
FIG. 2 is another flow chart illustrating an emergency accurate control method for large-scale interruptible loads provided by an embodiment of the present disclosure.

FIG. 2 is another flow chart illustrating an emergency accurate control method for large-scale interruptible loads provided by an embodiment of the present disclosure. On the basis of the above embodiment, referring to FIG. 2, the step in which the to-be-shed control substations perform the load shedding on the second to-be-shed load includes steps described below.

In step S201, a control substation acquires a sheddable terminal load sequence table.

Specifically, a load control terminal collects active power of interruptible load branch circuits, calculates a total sheddable load of the load control terminal, and sends the total sheddable load to the control substation. The control substation divides the load control terminals into layers according to layer setting values, calculates a total sheddable load of each layer, and generates a sheddable terminal load sequence table.

In step S202, the to-be-shed control substation performs minimum under-shedding matching layer by layer in the sheddable terminal load sequence table according to the second to-be-shed load, and sheds the sheddable load corresponding to load control terminal matching with the second to-be-shed load.

Specifically, the to-be-shed control substation performs layer-by-layer matching of the second to-be-shed load in the sheddable terminal load sequence table according to the minimum under-shedding rule. If the second to-be-shed load is successfully matched, the to-be-shed control substation sheds the sheddable load corresponding to the successfully matched load control terminal; otherwise, the to-be-shed control substation continues to perform the layer-by-layer matching of the second to-be-shed load in the sheddable terminal load sequence table till the second to-be-shed load is successfully matched.

In step S203, the to-be-shed control substation sends a third to-be-shed load to the to-be-shed load control terminal for load shedding if the third to-be-shed load exists, where the total amount of the sheddable load corresponding to the load control terminals matching with the third to-be-shed load is equal to a difference between the second to-be-shed load and the third to-be-shed load.

Specifically, the third to-be-shed load refers to a remaining to-be-shed load after the to-be-shed control substation perform the layer matching of the to-be-shed load in the sheddable terminal load sequence table and shed the sheddable load corresponding to the successfully matched load control terminal. The remaining to-be-shed load is less than the sheddable load of each load control terminal. If the third to-be-shed load exists, the to-be-shed control substation sends the third to-be-shed load to the to-be-shed load control terminal; otherwise, the to-be-shed load control terminal performs the matching and the load shedding on interruptible branch circuits corresponding to the to-be-shed load control terminal according to the minimum under-shedding rule, so as to realize accurate control of the interruptible branch circuits of the large-scale dispersed interruptible loads and enhance quick and accurate shedding of the large-scale dispersed interruptible loads.

Exemplarily, on the basis of the examples in the above embodiments, the to-be-shed control substation performs the minimum under-shedding matching, which takes a terminal as a basic element, layer by layer in the sheddable terminal load sequence table according to the second to-be-shed load $P_{cut1}$. The to-be-shed control substation, such as the third control substation, receives an instruction of the second to-be-shed load $P_{cut1}$ from the superior region control master station and takes the $P_{cut1}$ as a to-be-shed load, so as to perform the minimum under-shedding matching in the load control terminals accessing the third control substation.

It is assumed that (i+j+k) load control terminals access the third control substation, and each load control terminal may be divided into n layers according to set priority setting values. $P_{11}^3$ is a load capacity of the first load control terminal of the first layer of load of the third control substation; and $P_{21}^3$ is a load capacity of the second load control terminal of the first layer of load of the third control substation; accordingly, $P_{kn}^3$ is a load capacity of the kth load control terminal of the nth layer of load of the third control substation, so the sheddable terminal load sequence table of the third control substation is as follows:

i load control terminals are arranged on the first layer, then the load capacity is: $P_{11}^3, P_{21}^3, P_{31}^3 \ldots P_{i1}^3$;

j load control terminals are arranged on the second layer, then the load capacity is: $P_{12}^3, P_{22}^3, P_{32}^3 \ldots P_{j2}^3$;

k load control terminals are arranged on the nth layer, then the load capacity is: $P_{1n}^3, P_{2n}^3, P_{3n}^3 \ldots P_{kn}^3$.

If the second to-be-shed load $P_{cut1}$ i is included between $P_{11}^3+P_{21}^3$ and $P_{11}^3+P_{21}^3+P_{31}^3$ of the first layer of the third control substation, i.e., $\Sigma(P_{11}^3, P_{21}^3) \leq P_{cut1} < \Sigma(P_{11}^3, P_{21}^3, P_{31}^3)$, all loads of the first load control terminal and the second load control terminal of the first layer of the third control substation are directly shed, and the remaining to-be-shed load is denoted as the third to-be-shed load $P_{cut2}$, then $P_{cut2} = P_{cut1} - \Sigma(P_{11}^3, P_{21}^3)$.

If $P_{cut2}=0$, a control instruction is directly sent to shed all the loads of the first load control terminal and the second load control terminal of the first layer of the third control substation, and the distribution is ended.

If $P_{cut2}>0$, a control instruction including $P_{cut2}$ is sent to the third load control terminal of the first layer of the third control substation.

It should be noted that the to-be-shed load control terminal in the present embodiment is the third load control terminal, and the third to-be-shed load is a remaining to-be-shed load $P_{cut2}$.

The emergency accurate control method for large-scale interruptible loads of the present embodiment realizes layer-by-layer distribution and shedding of the sheddable loads for the terminals, and preferentially sheds the sheddable loads of the load control terminals corresponding to the layers with high priorities within the to-be-shed load range, and is high in precision.

Figure 3:
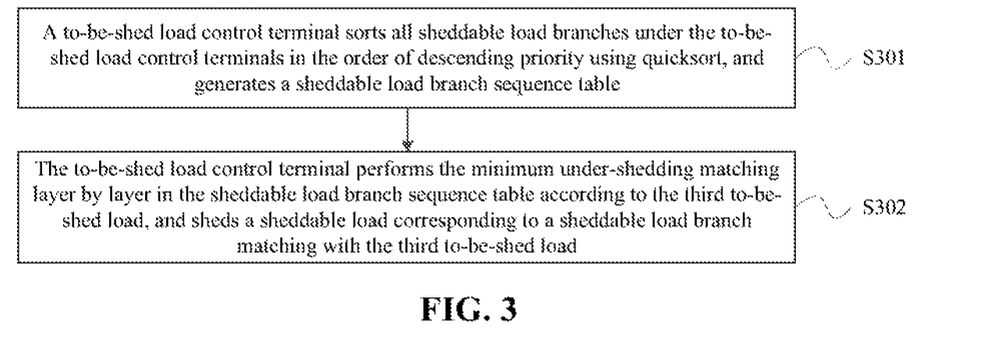
FIG. 3 is another flow chart illustrating an emergency accurate control method for large-scale interruptible loads provided by an embodiment of the present disclosure.

FIG. 3 is another flow chart illustrating an emergency accurate control method for large-scale interruptible loads provided by an embodiment of the present disclosure. On the basis of the above embodiments, referring to FIG. 3, the step in which the to-be-shed load control terminal performs load shedding on the third to-be-shed load includes steps described below.

In step S301, the to-be-shed load control terminal sorts all sheddable load branches under the to-be-shed load control terminal using quicksort in the order of descending priority, and generate a sheddable load branch sequence table.

Specifically, the load control terminal collect voltage signals, current signals and switch position signals of the interruptible load branch circuits of the load control terminal, and calculates active powers of the interruptible load branch circuits of users in real time. A total sheddable load of this load control terminal is calculated in real time according conditions, such as a shedding-allowable state, a work and stop state and a power direction, of each branch circuit. All the sheddable load branch circuits under the to-be-shed load control terminal are sorted in the order of descending priority using quicksort, and the sheddable load branch sequence table is generated.

In step S302, the to-be-shed load control terminal performs the minimum under-shedding matching layer by layer in the sheddable load branch sequence table according to the third to-be-shed load, and shed the sheddable load corresponding to the sheddable load branch matching with the third to-be-shed load.

Specifically, the to-be-shed load control terminal performs branch matching in the sheddable branch circuit sequence table according to the third to-be-shed load, and cut a corresponding branch circuit switch according to the minimum under-shedding rule.

Exemplarily, on the basis of the above embodiments, the third load control terminal of the first layer subordinate to the to-be-shed control substation, such as the third control substation, receives a superior load shedding instruction, namely receives an instruction for shedding the third to-be-shed load $P_{cut2}$ of the to-be-shed control substation. The third load control terminal takes $P_{cut2}$ as a to-be-shed load capacity to perform the minimum under-shedding matching in the interruptible load branch circuit accessing this load control terminal.

It is assumed that a number x of interruptible load branch circuits access this load control terminal. The x interruptible load branch circuits are set to have x priorities, i.e., 1, 2, 3, 4 . . . , (x−1) and x. The smaller the serial number of the branch circuit is, the higher the priority is, namely the load control terminal is shed more preferentially.

Load elements of the branch circuits are sorted in the order of descending priority using quicksort.

A sheddable load element priority sequence table of the third control terminal may be set as follows:

$P_1^{33}, P_2^{33} P_3^{33} \ldots P_{(x-1)}^{33}, P_x^{33}$.

A total sheddable capacity of each round of priority is calculated according to the priority and the sheddable capacity of each sorted load, so the sheddable branch circuit sequence table may be set as follows:

the sheddable load of the first round: $P_1^{33}$;
the sheddable load of the second round: $\Sigma(P_1^{33}, P_2^{33})$;
the sheddable load of the third round: $\Sigma(P_1^{33}, P_2^{33}, P_3^{33})$
the sheddable load of the xth round: $\Sigma(P_1^{33}, P_2^{33}, P_3^{33} \ldots P_{(x-1)}^{33}, P_x^{33})$.

$P_x^{33}$ indicates the sheddable load capacity of the xth round of the third load control terminal in the first layer of the third control substation. The total sheddable load of this load control terminal, namely the third load control terminal in the first layer of the third control substation, is denoted as $P_{all}^{33}$, then all $P_{all}^{33} = \Sigma(P_1^{33}, P_2^{33}, P_3^{33} \ldots P_{(x-1)}^{33}, P_x^{33})$.

A to-be-shed branch circuit y is obtained according to the third to-be-shed load $P_{cut2}$ and the minimum under-shedding rule, and then the to-be-shed load control terminal quickly sheds all the branch circuits with the priorities from 1 to y, so as to realize accurate distribution of the load control capacities.

Figure 4:
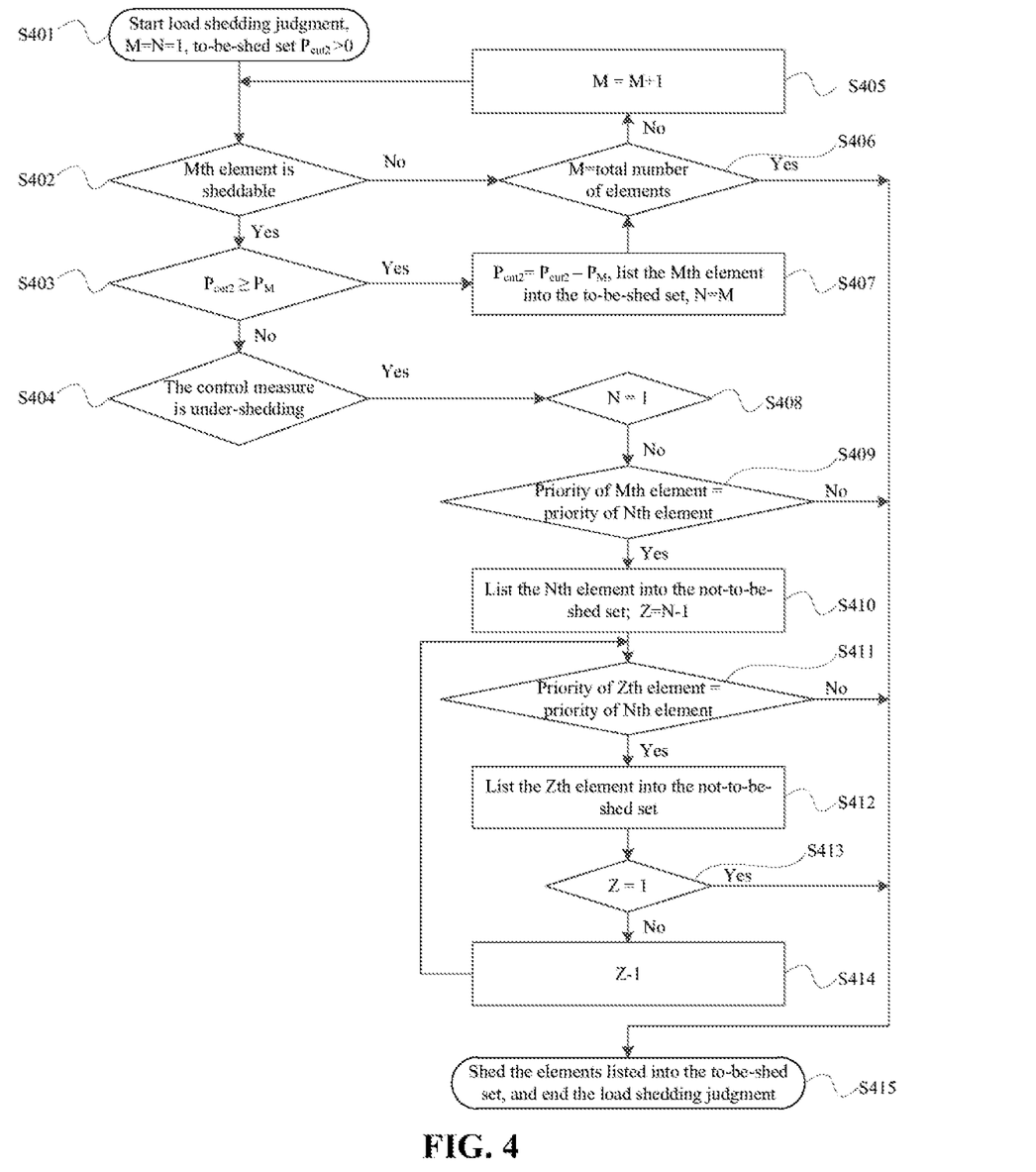
FIG. 4 is another flow chart illustrating an emergency accurate control method for large-scale interruptible loads provided by an embodiment of the present disclosure.

FIG. 4 is another flow chart illustrating an emergency accurate control method for large-scale interruptible loads provided by an embodiment of the present disclosure. On the basis of the above embodiments, referring to FIG. 4, a selective shedding judgment process, in which the to-be-shed load control terminal sheds the subordinate interruptible branch circuit, generates the sheddable load element priority sequence table is as follows.

It is assumed that M and N are natural numbers and both indicate element serial numbers of the interruptible branch circuits in the sequence table after the sequence table is generated by sorting the load control terminals according to the order of priority, and Z is a serial number of a re-judged sheddable load branch circuit.

In step S401, the load shedding judgment starts, where M=N=1 and the third to-be-shed load $P_{cut2}$>0.

In step S402, whether the Mth element in the sequence table is sheddable or not is judged; if the Mth element is sheddable, the process goes to step S403; otherwise, the process goes to step S406.

In step S403, whether the third to-be-shed load $P_{cut2}$ is greater than a load $P_M$ of the Mth element or not is judged; if $P_{cut2}$ is greater than $P_M$, the process goes to step S407; otherwise, the process goes to step S404.

When the third to-be-shed load $P_{cut2}$ is judged to be greater than or equal to the load $P_M$ of the Mth element in step S403, the process goes to step S407. In step S407, $P_{cut2}=P_{cut2}-P_M$; the Mth element is listed into a to-be-shed element object set, and N is set to be equal to M. N refers to a serial number of a initially judged sheddable load element, namely the serial number N of the initially judged sheddable load element is set to be equal to M, and the process goes to step S406. In step 406, whether M is equal to the total number of elements or not is judged. If M is equal to the total number of elements, it determines that the serial number of the Mth sheddable element is equal to the total number of elements, and the process goes to step S415. In step 415, the Mth element is listed into the to-be-shed element object set, and the load shedding judgment is ended. If M is not equal to the total number of elements, the process goes to step S405. In step 405, M=M+1 and the process continuous to search the next element of the Mth element; the process then returns to step S402 to judge whether the Mth element is sheddable or not. If the Mth element is not sheddable, the process goes to step 406.

When the third to-be-shed load $P_{cut2}$ is judged to be less than the load $P_M$ of the Mth element in step S403, the process goes to step S404. In step S404, whether the current control measure is based on the under-shedding rule or not is judged. If the current control measure is judged to be based on the under-shedding rule, the process goes to step S408 to judge whether N=1 works or not, where N is a serial number of the previous element of the Mth element in the sequence table. If the current control measure is judged to be not based on the under-shedding rule, the process goes to step S409 to judge whether the priority of the Mth element is equal to that of the Nth element, where the Nth element is the previous element of the Mth element in the sequence table. If the priority of the Mth element is judged to be equal to that of the Nth element, the process goes to step S415 to shed the element which is listed into the to-be-shed element object set in step S407, and the load shedding judgment is ended. Otherwise, i.e., if the priority of the Mth element is equal to that of the Nth element, the priorities of the Mth element and the Nth element are bound, and the process goes to step S410 to list the Nth element into a not-to-be-shed element object set, and Z=N−1, where Z is a serial number of the previous element of the Nth element in the sequence table. Then the process goes to step S411 to judge whether the priority of the Zth element is equal to that of the Nth element or not. If the priority of the Zth element is judged to be not equal to that of the Nth element, i.e., if the priority of the Zth element is not equal to that of the Nth element, the process goes to step S415 to shed the current element listed into the to-be-shed element object set, and the load shedding judgment is ended. If the priority of the Zth element is judged to be equal to that of the Nth element, i.e., if the priority of the Zth element is equal to that of the Nth element, the Zth element and the Nth element are bound, and the process goes to step S412 to list the Zth element into the not-to-be-shed element object set. Then, Step S413 is executed to judge whether Z is equal to 1, namely whether the Zth element is the first element in the sequence table. If Z is equal to 1, Step S415 is executed to shed the current element listed into the to-be-shed object set, and the load shedding judgment is ended. If Z is not equal to 1, Z is set to be equal to Z−1, and Step S411 is executed again to exclude the elements with the same priority from the to-be-shed element object set. Step S415 is finally executed to shed the elements listed into the to-be-shed object set, and the whole load shedding judgment is ended.

It should be noted that the present disclosure performs the matching according to the minimum under-shedding rule. In Step S404 of judging whether the current control measure is based on the under-shedding rule or not, only a YES situation is drawn exemplarily.

The emergency accurate control method for the large-scale interruptible loads of the present embodiment realizes distribution and shedding of the large-scale interruptible load branch circuits according to different layers and different priorities. The interruptible load branch circuit with the highest priority is shed preferentially, so that the precision is higher, and the selectivity is higher.

In an embodiment, the region control master station communicates with the control substations through a 2M channel of a Synchronous Digital Hierarchy (SDH) backbone transmission network. The control substations communicate with the load control terminals in any one of or a combination of various ways of shared 2M channel for communication optical cables, exclusive 2M channel for coaxial cables, wireless communication via 4G private network and Ethernet.

Specifically, the emergency accurate control system for interruptible loads is generally divided into three layers, namely a region control master station layer, a control substation layer and a user load control terminal access layer. The user load control terminal access layer adopts various flexible communication access modes according to the types of accessed interruptible loads. The specific method may include: the 2M channel between the region control master station and the control substations is supported by an inter-provincial or provincial SDH backbone transmission network, and a communication system may provide double-device and double-route configuration conditions for A set of apparatus and B set of apparatus. A downlink communication interface of the region control master station is an E1 interface that meets the protocol G.703. Uplink communication interfaces of the control substations and the region control master station are E1 interfaces, and a downlink interface of the user load control terminal access layer is a 155M optical fiber interface that meets the STM-1 frame structure standard.

The user load control terminal access layer is accessed into the control substations in different modes according to the characteristic differences of interruptible loads managed by the user load control terminal access layer. The access scale of each control substation covers 240 loads. If the interruptible loads are general large users, such as an industrial user, a large-sized commercial user, an automobile charging station and an energy storage power station, since a user-side power distribution station does not have SDH device, a communication optical cable is required to be built between a user station and an access transformer substation to provide an optical fiber channel from the load control terminals to the access transformer substation. A specialized multi-user aggregation photoelectric conversion device accesses the SDH device through the E1 interface, so as to build a communication link for sharing the 2M channel with the control substations. If the interruptible load is an auxiliary system of a large industrial and mining enterprise of a coal-fired power plant, since such user generally has the SDH device, such interruptible auxiliary load control terminal can directly accesses an in-situ SDH through the E1 interface by adopting a 75-ohm coaxial cable to build communication connection with the control substations for exclusively using the 2M channel. The communication interface apparatuses accessed into the transformer substation and the power plant shall provide mutually standby uplink ports of the channel A and the channel B. For a few large users located at relatively far geographic positions where optical fiber channels are hard to lay, a wireless communication access mode can be adopted if the load control terminals are within a range covered by the 4G private network (TD-LTE, Time Division-Long Term Evolution). A CPE (Customer Premises Equipment) is equipped on the user side. A multi-user access apparatus and a photoelectric conversion module are disposed at a TD-LTE core network switch. The multi-user access apparatus is upwards connected to the E1 interface of the SDH device and downwards connected to the photoelectric conversion module. The photoelectric conversion module is connected to the core network switch through the Ethernet.

Figure 5:
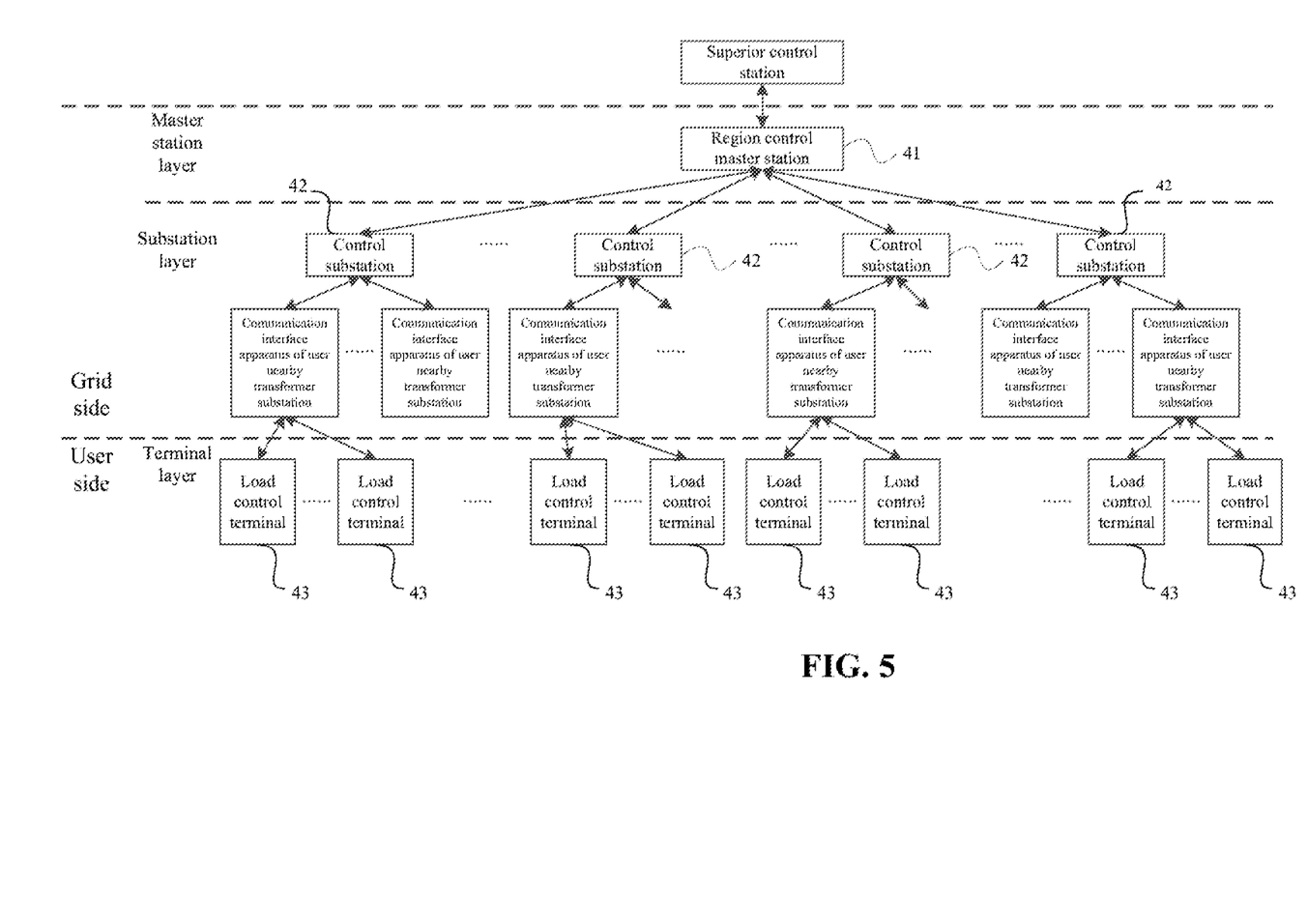
FIG. 5 is a schematic diagram illustrating an emergency accurate control system for large-scale interruptible loads provided by an embodiment of the present disclosure.

Embodiments of the present disclosure provide an emergency accurate control system for large-scale interruptible loads. FIG. 5 is a schematic diagram illustrating an emergency accurate control system for large-scale interruptible loads provided by an embodiment of the present disclosure. Referring to FIG. 5, the emergency accurate control system for large-scale interruptible loads, provided by the embodiment of the present disclosure, includes a region control master station 41, control substations 42 and load control terminals 43. The region control master station 41 is connected with at least one control substation 42, and each control substation 42 is connected with at least one load control terminal 43.

The region control master station 41 is configured to acquire a sheddable load sequence table which includes a sheddable load of each layer of each control substation; acquire a first to-be-shed load; perform minimum under-shedding matching layer by layer in the sheddable load sequence table according to the first to-be-shed load, and shed a sheddable load corresponding to at least one control substation matching with the first to-be-shed load; and send a second to-be-shed load to the to-be-shed control substations for load shedding if the second to-be-shed load exists, where the total amount of the sheddable load corresponding to the control substation matching with the first to-be-shed load is equal to a difference between the first to-be-shed load and the second to-be-shed load.

In an embodiment, the region control master station 41 is specifically configured to receive a sheddable load, sent by the each control substation, of each layer of the each control substation, and generate the sheddable load sequence table. The sheddable load of each layer of each control substation is obtained from collection and calculation of sheddable load information received by the each control substation from all the load control terminals connected to the each control substation, and the sheddable load information of each load control terminal includes a total power of all sheddable load branches under the each load control terminal.

In an embodiment, the each control substation 42 is configured to acquire a sheddable terminal load sequence table; perform the minimum under-shedding matching layer by layer in the sheddable terminal load sequence table according to the second to-be-shed load, and shed a sheddable load corresponding to at least one load control terminal matching with the second to-be-shed load; and send a third to-be-shed load to a to-be-shed load control terminal for load shedding if the third to-be-shed load exists. The total amount of the at least one sheddable load corresponding to the at least one load control terminal is equal to a difference between the second to-be-shed load and the third to-be-shed load.

In an embodiment, the each load control terminal 43 is configured to sort all sheddable load branches under the to-be-shed load control terminals using quicksort in the order of descending priority, and generate a sheddable load branch sequence table; and perform the minimum under-shedding matching in the sheddable load branch sequence table according to the third to-be-shed load, and shed a load corresponding to at least one sheddable load branch matching with the third to-be-shed load.

In an embodiment, the region control master station 41 communicates with the control substations 42 through a 2M channel of an SDH backbone transmission network. The control substations 42 communicate with the load control terminals 43 in any one of or a combination of various ways of shared 2M channel for communication optical cables, exclusive 2M channel for coaxial cables, wireless communication via 4G private network and Ethernet.

The emergency accurate control system for large-scale interruptible loads provided by the embodiment of the present disclosure includes the region control master station, the control substations and the load control terminals. The region control master station receives the sheddable load, sent by each control substation, of each layer of each control substation, and generates the sheddable load sequence table. The control substation performs the minimum under-shedding matching on the sheddable load layer by layer. The load control terminal sort the priorities of the sheddable loads and accurately and quickly shed the sheddable loads. The emergency accurate control system for large-scale interruptible loads, provided by the embodiment of the present disclosure, supports the access of the large-scale dispersed interruptible load stations and accurate and quick shedding of the loads, and can meet a control demand of a grid for quickly shedding the socially widely distributed interruptible loads according to the to-be-shed load under a large-disturbance condition, so as to achieve effects of accurate control of objects, accurate control capacity distribution and execution, large scale of accessed load stations and the like.

On the basis of the above embodiments, the present embodiment further provides a computer readable storage medium which stores a computer program. The instructions in the storage medium, when executed by a processor of the emergency accurate control system for large-scale interruptible loads, realizes the emergency accurate control method for large-scale interruptible loads in any of the above embodiments of the present disclosure. The method includes: the region control master station acquires a sheddable load sequence table, where the sheddable load sequence table includes a sheddable load of each layer of each control substation; the region control master station acquires a first to-be-shed load; the region control master station performs the minimum under-shedding matching layer by layer in the sheddable load sequence table according to the first to-be-shed load, and sheds a sheddable load corresponding to control substation matching with the first to-be-shed load; and the region control master station sends a second to-be-shed load to the to-be-shed control substation for load shedding if the second to-be-shed load exists, where the total amount of the sheddable loads corresponding to the control substation matching with the second to-be-shed load is equal to a difference between the first to-be-shed load and the second to-be-shed load.

Of course, the computer readable storage medium including an executable instruction provided by embodiments of the present disclosure can execute the instructions which are not limited to the above operation of the emergency accurate control method for the large-scale interruptible loads, can also execute related operation in the emergency accurate control method for the large-scale interruptible loads provided by any embodiment of the present disclosure, and has corresponding functions and beneficial effects.

Through the above description for embodiments, those skilled in the art can clearly understand that the present disclosure can be achieved by means of software and necessary universal hardware, and of course, can also be achieved through hardware. However, in many cases, the former is a better embodiment. Based on such understanding, the present disclosure can be reflected in a form of a software product in essence or in a part of making a contribution to the related art. The software product can be stored in a readable storage medium, such as a read-only memory (ROM), a random access memory (RAM), a flash and the like of the emergency accurate control system for the large-scale interruptible loads, including several instructions to enable one emergency accurate control system device for the large-scale interruptible loads to execute the emergency accurate control method for the large-scale interruptible loads in embodiments of the present disclosure.

It should be noted that, the above only describes preferred embodiments of the present disclosure and applied technical principles. Those skilled in the art shall understand that the present disclosure is not limited to specific embodiments described herein. For those skilled in the art, various apparent variations, readjustments and replacements can be made without departing from a protection scope of the present disclosure. Therefore, although the present disclosure is described in detail through the above embodiments, the present disclosure is not limited to the above embodiments and may further include more other equivalent embodiments without departing from the concept of the present disclosure, while the scope of the present disclosure is decided by a scope of attached claims.

What is claimed is:

1. An emergency accurate control method for large-scale interruptible loads, applied to an emergency accurate control system for large-scale interruptible loads, wherein the emergency accurate control system for interruptible loads comprises a region control master station, a plurality of control substations, and a plurality of load control terminals; the region control master station is connected with the plurality of control substations; each control substation of the plurality of control substations is connected with at least one load control terminal of the plurality of load control terminals; the at least one load control terminal connected to the each control substation is configured on at least one layer, the at least one layer is in one-to-one correspondence with the at least one load control terminal and is used to represent a load shedding priority of the at least one load control terminal;

wherein the method comprises:
  acquiring, by the region control master station, a sheddable load sequence table, wherein the sheddable load sequence table comprises a sheddable load of each layer of the each control substation;
  acquiring, by the region control master station, first to-be-shed load information indicating a first to-be-shed load;
  performing, by the region control master station, minimum under-shedding matching layer by layer between the first to-be-shed load and the sheddable load of the each layer of the each control substation in the sheddable load sequence table, and shedding a sheddable load corresponding to at least one control substation matching with the first to-be-shed load; and
  in a case where a difference between the first to-be-shed load and the matched sheddable load corresponding to the at least one control substation is not zero, determining the difference to be a second to-be-shed load, and sending, by the region control master station, second to-be-shed load information for indicating the second to-be-shed load to a to-be-shed control substation for load shedding in a case of existence of the second to-be-shed load.

2. The method according to claim 1, wherein acquiring, by the region control master station, the sheddable load sequence table comprises:
  receiving, by the region control master station, sheddable load information indicating a sheddable load, sent by the each control substation, of each layer of the each control substation, and generating the sheddable load sequence table,
  wherein the sheddable load of each layer of the each control substation is obtained from collection and calculation of the sheddable load information received by the each control substation from all the plurality of load control terminals connected to the each control substation, and the sheddable load information of each load control terminal of the plurality of load control terminals comprises a total power of all sheddable load branches under the each load control terminal.

3. The method according to claim 2, further comprising:
  performing, by the to-be-shed control substation, the load shedding according to the second to-be-shed load,
  wherein performing, by the to-be-shed control substation the load shedding according to the second to-be-shed load comprises:
  acquiring, by the each control substation, a sheddable terminal load sequence table;
  performing, by the to-be-shed control substation, the minimum under-shedding matching layer by layer in the sheddable terminal load sequence table according to the second to-be-shed load, and shedding a sheddable load corresponding to at least one load control terminal matching with the second to-be-shed load; and
  in a case where a difference between the second to-be-shed load and the matched sheddable load corresponding to at least one load control terminal matching with the second to-be-shed load is not zero, determining the difference to be a third to-be-shed load, and sending, by the to-be-shed control substation, third to-be-shed load information indicating the third to-be-shed load to a to-be-shed load control terminal for load shedding in a case of existence of the third to-be-shed load.

4. The method according to claim 3, further comprising: performing, by the to-be-shed load control terminal, the load shedding according to the third to-be-shed load,
wherein performing, by the to-be-shed load control terminal, the load shedding according to the third to-be-shed load comprises:
sorting, by the to-be-shed load control terminal, all sheddable load branches under the to-be-shed load control terminal using quicksort in an order of descending priority, and generating a sheddable load branch sequence table; and
performing, by the to-be-shed load control terminal, the minimum under-shedding matching in the sheddable load branch sequence table according to the third to-be-shed load, and shedding a load corresponding to at least one sheddable load branch matching with the third to-be-shed load.

5. The method according to claim 1, wherein the region control master station communicates with the plurality of control substations through a 2M channel of a Synchronous Digital Hierarchy (SDH) backbone transmission network; and the control substations communicate with the plurality of load control terminals in any one of or a combination of ways of a group consisting of: shared 2M channel for communication optical cables, exclusive 2M channel for coaxial cables, and wireless communication via 4G private network and Ethernet.

6. An emergency accurate control system for large-scale interruptible loads, comprising: a region control master station, a plurality of control substations and a plurality of load control terminals, wherein the region control master station is connected with the plurality of control substations, and each control substation of the plurality of control substations is connected with at least one load control terminal of the plurality of load control terminals; the at least one load control terminal connected to the each control substation is configured on at least one layer, the at least one layer is in one-to-one correspondence with the at least one load control terminal and is used to represent a load shedding priority of the at least one load control terminal;
wherein the region control master station is configured to:
acquire a sheddable load sequence table, wherein the sheddable load sequence table comprises a sheddable load of each layer of the each control substation;
acquire first to-be-shed load information indicating a first to-be-shed load;
perform minimum under-shedding matching layer by layer between the first to-be-shed load and the sheddable load of the each layer of the each control substation in the sheddable load sequence table, and shed a sheddable load corresponding to at least one control substation matching with the first to-be-shed load; and
in a case where a difference between the first to-be-shed load and the matched sheddable load corresponding to the at least one control substation is not zero, determine the difference to be a second to-be-shed load, and send second to-be-shed load information for indicating the second to-be-shed load to a to-be-shed control substation for load shedding in a case of existence of the second to-be-shed load.

7. The system according to claim 6, wherein the region control master station is configured to receive sheddable load information indicating a sheddable load, sent by the each control substation, of each layer of the each control substation, and generate the sheddable load sequence table,
wherein the sheddable load of each layer of the each control substation is obtained from collection and calculation of the sheddable load information received by the each control substation from all the plurality of load control terminals connected to the each control substation, and the sheddable load information of each load control terminal of the plurality of load control terminals comprises a total power of all sheddable load branches under the each load control terminal.

8. The system according to claim 7, wherein the each control substation is configured to:
acquire a sheddable terminal load sequence table;
perform the minimum under-shedding matching layer by layer in the sheddable terminal load sequence table according to the second to-be-shed load, and shed a sheddable load corresponding to at least one load control terminal matching with the second to-be-shed load; and
in a case where a difference between the second to-be-shed load and the matched sheddable load corresponding to at least one load control terminal matching with the second to-be-shed load is not zero, determine the difference to be a third to-be-shed load, and send third to-be-shed load information indicating the third to-be-shed load to a to-be-shed load control terminal for load shedding in a case of existence of the third to-be-shed load.

9. The system according to claim 8, wherein the each load control terminal is configured to:
sort all sheddable load branches under the to-be-shed load control terminal using quicksort in an order of descending priority, and generate a sheddable load branch sequence table; and
perform the minimum under-shedding matching in the sheddable load branch sequence table according to the third to-be-shed load, and shed a load corresponding to at least one sheddable load branch matching with the third to-be-shed load.

10. The system according to claim 6, wherein the region control master station communicates with the plurality of control substations through a 2M channel of a Synchronous Digital Hierarchy (SDH) backbone transmission network; and the control substations communicate with the plurality of load control terminals in any one of or a combination of ways of a group consisting of: shared 2M channel for communication optical cables, exclusive 2M channel for coaxial cables, and wireless communication via 4G private network and Ethernet.

* * * * *

UNITED STATES PATENT AND TRADEMARK OFFICE
CERTIFICATE OF CORRECTION

PATENT NO.       : 10,886,740 B2
APPLICATION NO.  : 16/409564
DATED            : January 5, 2021
INVENTOR(S)      : Jijun Yu et al.

Page 1 of 1

It is certified that error appears in the above-identified patent and that said Letters Patent is hereby corrected as shown below:

On the Title Page

Item (73) should be corrected to read:
-- (73) Assignees: State Grid Jiangsu Electric Power Co., Ltd., Nanjing Jiangsu (CN);
                   Nari Technology Co., Ltd., Nanjing Jiangsu (CN) --.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*